Dec. 24, 1963  F. FOLSOM  3,114,997
COTTON SCREENERS FOR COTTON PICKERS OF THE TYPE
USING ROTARY SPINDLES AND DOFFERS
Filed Oct. 6, 1961
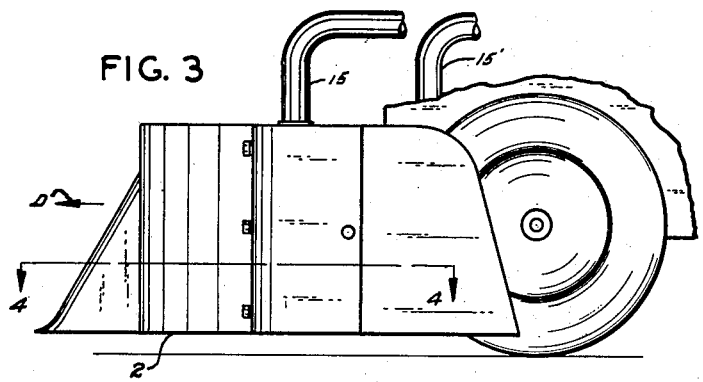
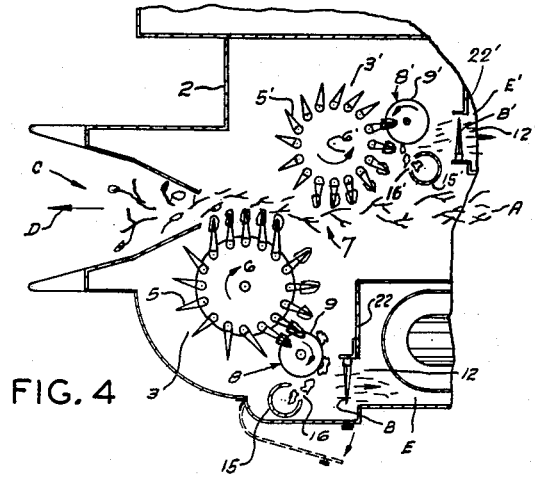
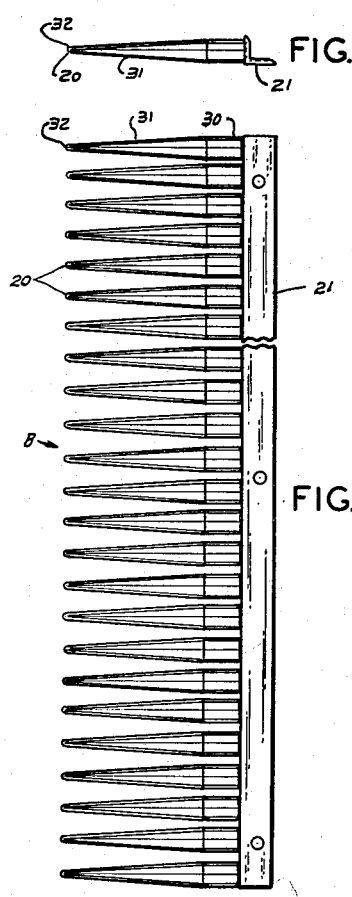
INVENTOR.
Fletcher Folsom
BY Scott L. Norvell
Atty 3,114,997
COTTON SCREENERS FOR COTTON PICKERS OF THE TYPE USING ROTARY SPINDLES AND DOFFERS
Fletcher Folsom, P. O. Box 1192, Coolidge, Ariz.
Filed Oct. 6, 1961, Ser. No. 143,461
3 Claims. (Cl. 56—44)

This invention pertains to cotton screeners for cotton pickers of the type using rotary spindles and doffers.

Heretofore in this type of machine an ordinary screen having vertical bars and transverse cross bars has been used in the draft exits to catch the cotton released from the spindles by the doffers. However, it has been found that this type of screen, while it restrains the movement of the cotton, and to some extent lets the trash go by and outward through the air exit, nevertheless tends to clog up in a very short time and becomes useless.

My invention concerns an improved type of screening device which will retain the cotton and let the trash go by but at the same time will not clog up with excess cotton.

Another object of the device is to provide in the type of picker above mentioned, a screening device in the air exit passageway between the spindles, doffer and exit which will retain and hold back cotton tufts but at the same time will let trash, such as sticks, broken leaves, stems and the like, go through into the air exit and be carried outward into a place of deposit.

Other objects will appear hereinafter.

I attain the foregoing objects by means of the devices, parts and combinations of parts as shown in the accompanying drawings, in which:

FIGURE 1 is a side elevational view of my improved type of cotton strainer;

FIGURE 2 is a plan view thereof;

FIGURE 3 is a side elevational view of a cotton picker of the type on which this strainer may be used, and FIGURE 4 is a sectional plan view of a portion of the machine shown in FIGURE 3; said section being taken on line 4—4 of FIGURE 3.

Similar numerals refer to similar parts in the several views.

It should be understood that in a machine of the type shown in FIGURE 3, the casing 2 encloses the pickers 3 and 3' which have a plurality of spindles 5 and 5'. The pickers, or picking cylinders, revolve in the directions shown by the arrows 6 and 6' and operated on the cotton plants 7 as the machine proceeds along the cotton row A (FIGURE 4). The casing 2 is provided with cotton receiving pipes 15 and 15' which are connected to a conventional blower mounted on the machine. The blower may be the same type as shown in U.S. Patent 2,904,948.

In this type of picker the cotton is removed from the spindles by rotary doffers 8 and 8' which include plates 9 and 9' which rotate near but not quite in contact with the spindles 5 and 5', respectively.

As the cotton is loosened from the spindles by the doffer, the doffer rotating plates tend to throw it in a direction tangential to the periphery of the plates 9 and 9'.

This tends to throw some of the cotton towards the air vent 12. In machines heretofore made, a screen grating or a series of horizontally spaced bars was placed in the opening 12. While the main body of the cotton was sucked into the pipes 15 and 15' through the slots 16 and 16', some of the cotton lodged on this grating at 12. It is to be understood that the opening 12 was intended to remove sticks and trash thrown from the doffers so that this trash would not be sucked up into the cotton receiving pipes 15 and 15'. As above stated, the gratings heretofore used in the opening 12 would soon clog up with cotton tufts and therefore become inoperative. As a result of this sticks and trash were sucked up into the cotton pipes 15 and 15' and degraded the cotton picked.

My improved strainer takes the place of the crossed elements of the screen and/or grids heretofore used and provides a series of horizontal pointed rods 20 closely spaced and held in a back frame 21 which is attached to plates 22 and 22' of the casing which embraces the picking elements 3 and 5 and 3' and 5'.

These pointed rods form what might be termed a comb because when placed close together on the supporting element 21 they resemble a comb. However, they do not act the same as a comb but act as strainers. These straining elements, or combs, let the sticks and trash go through between the individual points 20 and around the outer end of the group of points. A comb constructed in this manner will stop all cotton tufts which are not thrown by the doffer directly into the slots 16 and 16' of suction pipes 15 and 15'. These stopped tufts will then be picked up by the suction in pipes 15 and 15'. Meanwhile the trash, such as leaves, sticks and stems, easily go through the spaces between elements 20 of the comb B. In order to function as described certain qualifications must be met. First, the points 20 of bars 30 must be smooth and polished. This not only includes the bar part 30 but also the conical outer part 31.

It is to be noted that the base or bar part 30 is cylindrical while the outer part tapers to a point 32 at its end. These elements must be made of material which will maintain a smooth, rust free surface, otherwise cotton will stick to the surface and not slide outward from the base part to the points. It is to be noted that the points are directed parallel and outwardly from upright member 21. Due to the conical shape of the outer portions of elements 20 the spaces between each of these straining elements is wider towards their outside ends. This works best because the velocity of the cotton stripped from the spindles by the doffer plates is greater near the base 21 and therefore the openings between elements 20 must be less to slow down the velocity of these tufts. As the tufts leave the doffer plates their velocity diminishes rapidly and therefore the space between the outer ends of the strainer points 20 may be greater.

It should also be understood that the points 20 are directed from a position near the doffers 8 and 8' toward a position near the suction pipes 15 and 15'. Furthermore the strainer element points 20 are vertically spaced one over the other.

In the drawings it is to be understood that whereas A represents the row of cotton plants and 2 indicates the hood of the picking machine and C indicates the throat of the hood into which the cotton plants are forced as the machine advances in the direction of arrow D, the picking elements 3 and 3' operate on opposite sides of the cotton plant. The picking element and its parts on the left hand side of the machine, as one faces forward, is indicated by digits while the equivalent parts on the right hand side of the machine are indicated by the primed digits. It is to be observed that the picking elements are not directly opposite but the right hand element is spaced slightly to the rear of the left hand element (as in practice) in order to prevent interference of the spindles 5 and 5' and the parts connected with them.

In practice, after the comb like strainer elements B and B' are installed, as shown, the picker is used in the ordinary manner and the cotton is collected as intended by the manufacturers of the machine while the trash is all strained into the area E and E′, whereas the cotton lodging on the strainer elements works its way out to the ends of these elements and is dropped to the bottom of hood 2 from which position it is picked up by the draft of pipes 15 and 15′. Any small amount of cotton that is not caught on the strainer points or elements is negligible.

The result is that the trash is removed efficiently and rapidly and the strainer does not clog up with cotton.

In normal operation sticks and trash are not necessarily sucked through the rectangular openings 12 and 12′. There is no positive pressure necessary in the area embraced by the casing 2. Most of the sticks and cotton tufts directed toward rectangular openings 12 and 12′ are thrown off and thrown in the direction of this opening by operation of the doffer plates 9 and exit at E. The degree of suction in pipe 15 is great enough to draw the cotton into it both from the doffer 8 and from the bottom of the case 2 where some of it may fall after contacting the strainer elements B and B′.

Strainer elements made in the manner above described let the trash through easily and retain cotton tufts long enough so that they may be sucked into the slots 16 or dropped to the bottom of the case 2. With the points of the comb made as above described of smooth material, cotton tufts do not stick on the comb B and clog it up like they do in the present type of lattice screen placed in the rectangular openings 12 and 12′. Vibration of air in the air currents within hood 2 keeps cotton tufts which have lodged on strainer elements 20, agitated so that they move from a base 30 of the elements toward the tips 32 of said elements.

I claim:

1. A strainer for use on cotton pickers of the type having rotary picking spindles and rotary doffer disks and a casing enclosing the picking mechanism, having end walls provided with a trash exhaust opening and a cotton suction pipe; a cotton strainer comb comprising a plurality of polished metal points vertically spaced relative to each other and having their bases attached to said vertical supporting element attached to the end wall of said casing along a vertical edge of a trash exhaust opening of said casing.

2. A strainer for use on cotton pickers of the type having rotary spindles and rotary doffer disks enclosed in a casing having end plates with rectangular trash exhaust openings; slotted tubular cotton removal pipes within said casing; a strainer comb comprising a plurality of super-posed strainer elements having cylindrical bases and conical outer end portions with polished surfaces, attached in closely spaced relation to a vertical supporting bar; said bar being attached to an end plate of said casing along a vertical edge of one of said rectangular trash discharge openings in said casing.

3. The apparatus described in claim 2 wherein the supporting element for said comb elements is attached to the end plates of said casing along the inner edge of said rectangular opening and adjacent the center portion of said casing and wherein a draft of air is supplied to said casing to urge the removal of said trash and agitate cotton tufts lodged on said strainer element.

References Cited in the file of this patent
UNITED STATES PATENTS

| | | |
|---|---|---|
| 2,014,123 | Bailie | Sept. 10, 1935 |
| 2,904,948 | Hubbard | Sept. 22, 1959 |